March 10, 1953 — I. J. BARSY — 2,631,220
TEMPERATURE-RESPONSIVE DEVICE
Filed Dec. 22, 1948 — 2 SHEETS—SHEET 1
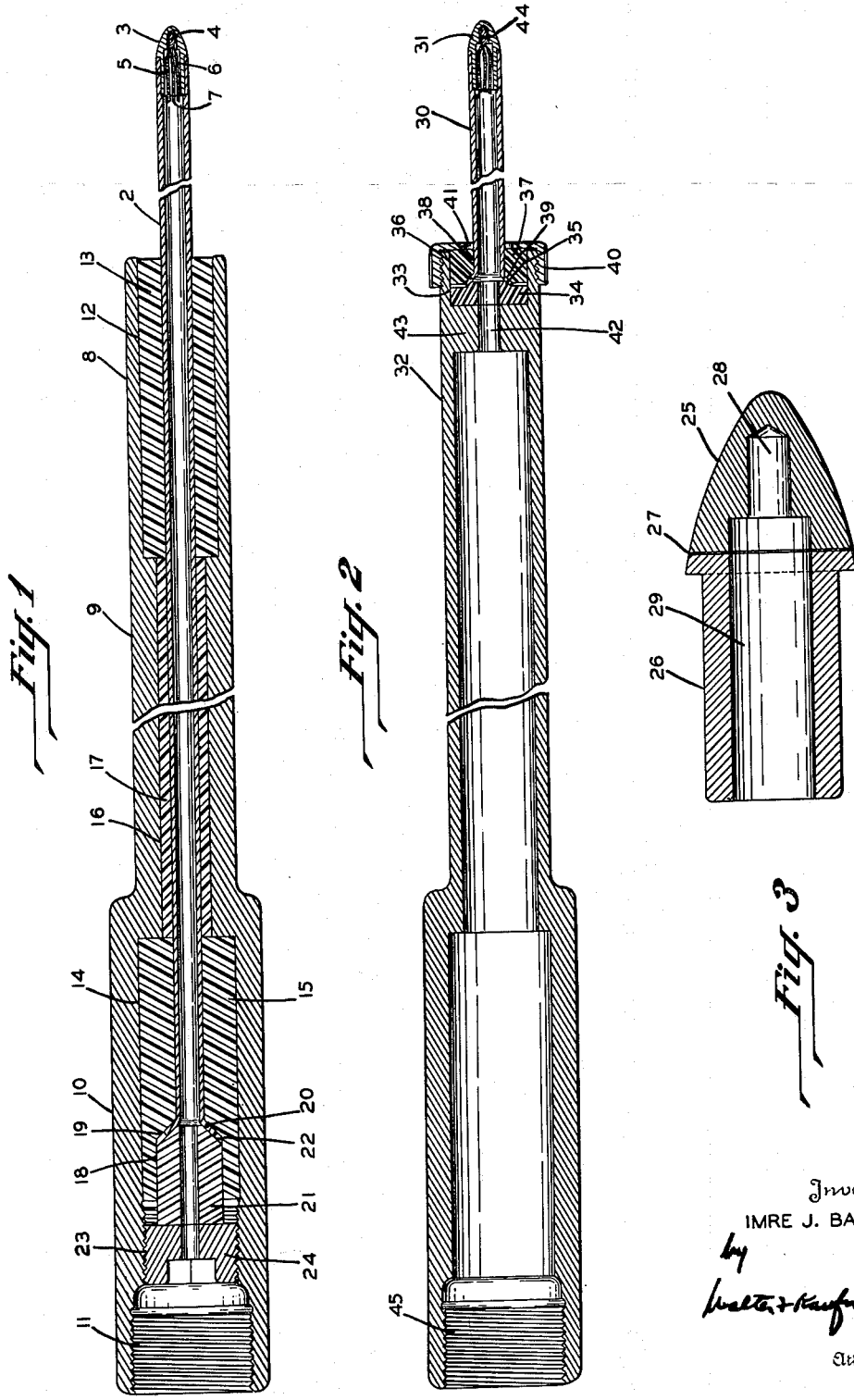
Inventor
IMRE J. BARSY March 10, 1953     I. J. BARSY     2,631,220
TEMPERATURE-RESPONSIVE DEVICE
Filed Dec. 22, 1948     2 SHEETS—SHEET 2
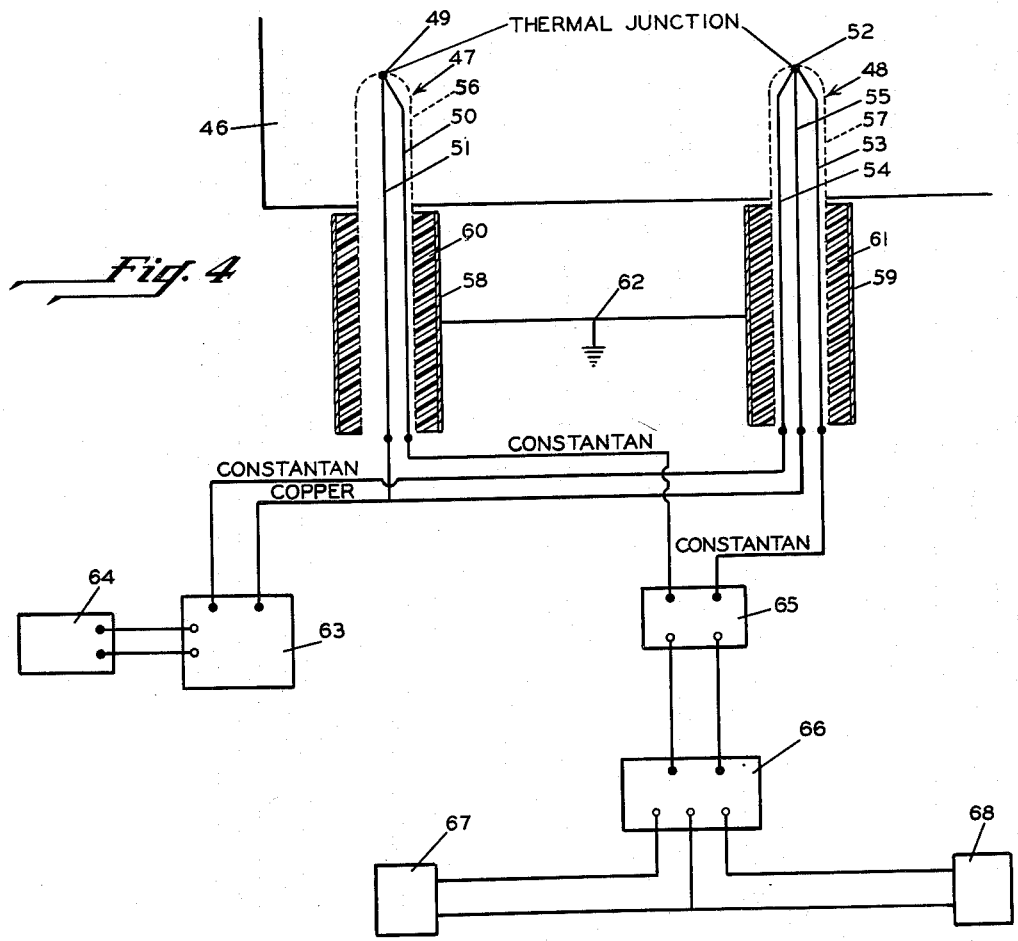
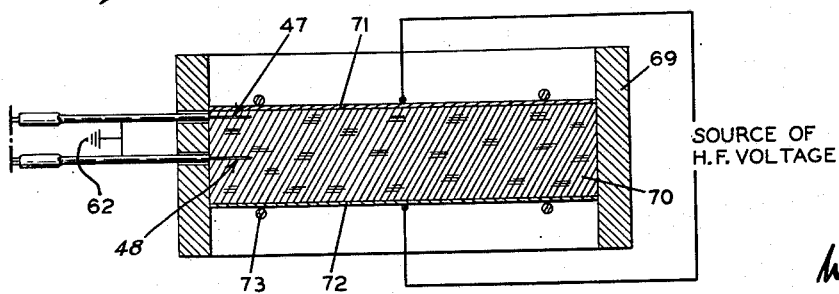
Inventor
IMRE J. BARSY
by
Walter + Kaufman
Attorney Patented Mar. 10, 1953

2,631,220

UNITED STATES PATENT OFFICE 2,631,220

TEMPERATURE-RESPONSIVE DEVICE

Imre J. Barsy, Lancaster, Pa., assignor to Armstrong Cork Company, Lancaster, Pa., a corporation of Pennsylvania Application December 22, 1948, Serial No. 66,670

3 Claims. (Cl. 219—47)

This invention relates to a temperature-responsive device and is concerned particularly with a device for use in connection with high frequency heating equipment where the high frequency currents may pose a problem of proper temperature response and control or indication.

The invention will be useful in many fields, although the embodiments which will be particularly described are designed for use in the manufacture of cork compositions and like masses, dielectrically heated within a mold and under compression.

In the manufacture of such products where high frequency currents are used to effect the elevation of the temperature of the mass, it is desirable, as specifically described and claimed in the copending application of George E. Gard, Serial No. 702,559, filed October 10, 1946, and entitled "Method and Apparatus for Dielectric Heating," now Patent 2,508,382, to provide a temperature-responsive device which may be directly inserted into the mass of material under treatment, the device being electrically connected to indicating and controlling equipment effective for maintaining a desired temperature within the mass and for discontinuing the supply of the heating current upon completion of the baking cycle. A probe type temperature-responsive device suitable for use with systems such as those of the Gard invention is disclosed in my copending application, Serial No. 750,275, filed May 24, 1947, and entitled "Temperature-Responsive Devices," now Patent 2,609,406. Where probe type devices are employed, utilizing thermocouples as the thermo-sensitive elements, the hollow high-frequency current conductor through which the thermocouple leads pass is split to electrically isolate one thermocouple and its probe tube from the other, and a condenser is disposed across the two sections for the flow of stray high frequency currents to ground while preventing the flow of small high frequency currents in the thermocouple circuits. This is a rather cumbersome arrangement; and, in order to be on the safe side and avoid any possible damage to the temperature recording and control instruments, it is necessary to use a relatively large condenser.

The probe tube, the supporting and actuating assembly, and the portion of the split conductor connected thereto constitute an electrical system of substantial exposed area which acts undesirably to permit the flow of high frequency currents therein, leading to false temperature indications and improper control. It is not possible to insulate the thermocouples or other thermo-sensitive elements at the tip of the probe disposed within the mass and thus reduce the capacitance effect of the system and also obtain the desired isolation of the thermocouples because it is essential that the probe tube be of relatively small dimensions in order to be readily inserted and withdrawn from the mass, and also in order to avoid the formation of an objectionable opening in the mass upon completion of the baking cycle and removal of the probe tube. The tip must also be of as small a mass as possible, in order to obtain high sensitivity of the thermo-sensitive elements. The use of electrical insulation at the tip would also reduce the heat sensitivity of the device, since the insulation would impede the rapid transfer of heat from the mass under treatment to the thermo-sensitive elements.

It is an object of this invention to provide a temperature-responsive device which is essentially free of any tendency to provide a path for high frequency currents which would adversely affect proper control or temperature indication.

Another object of the invention is to provide a temperature-responsive device of small size and high sensitivity which constitutes an electrical system of small surface area in the portion exposed to the high frequency field.

A further object of the invention is to provide a temperature-responsive device including a probe tube, a thermo-sensitive device electrically connected to the tube, and a supporting holder, with the tube and holder electrically isolated from each other.

An additional object of the invention is to provide a temperature-responsive device which will eliminate the need for a split conductor and condenser arrangement.

Generally, the device comprises a metallic probe tube which is adapted to be disposed within the mass under treatment. A thermo-sensitive element such as a thermocouple is disposed within the tube and electrically connected thereto. Preferably, this connection is made at the very tip of the probe tube by soldering. A shielding holder is provided for the tube and surrounds a portion thereof, providing a path to ground for stray high frequency currents. Electrical insulation is disposed between the probe tube and the holder, thus electrically insulating the two, one from the other. This arrangement provides a close coupling to ground.

In another aspect of the invention, I provide an apparatus for dielectrically heating a mass of material disposed between electrodes upon which may be impressed a high frequency voltage, comprising a thermal-responsive device adapted to be disposed within the mass during the dielectric heating, and comprising a metal probe tube, a thermo-sensitive element disposed within the tube and electrically connected thereto, a shielding holder for the probe tube, and electrical insulation between the tube and holder. There is provided in this combination electrical means controlled by the thermal-responsive device and electrically connected to the thermo-sensitive element by leads which pass through the probe tube and the holder, and means are provided for connecting the holder to ground. This apparatus is arranged to provide a close coupling to ground, and high frequency currents do not affect the temperature recording or control equipment.

The invention is illustrated in the attached drawings, in which:

Figure 1 is a sectional view illustrating a preferred form of probe device;

Figure 2 is a sectional view illustrating a modified probe device;

Figure 3 is a sectional view of a preferred tip structure for the probe tube;

Figure 4 is a schematic diagram showing the interconnection of a pair of temperature-responsive devices with suitable temperature indicating and control equipment; and Figure 5 is a diagrammatic view illustrating the disposition of a pair of temperature-responsive devices within a mass of cork composition disposed within a mold for high frequency baking.

Referring first to Figure 1, the device includes a probe tube 2 having a tip 3. The tube is preferably formed of "Inconel" which is an alloy of 80% nickel, 13% chromium, and the balance iron. It is resistant to corrosion and to heat and retains its strength after repeated heating and cooling. It has good resistance to bending. Disposed within the tip 3 is a thermo-sensitive element 4 in the nature of a thermal junction including two negative leads and one positive lead. The positive lead 5 may be formed of copper; the negative leads 6 and 7 of constantan. The wires are twisted together and inserted into the tip. Preferably, the twisted wires are coated with silver solder and are soldered into the tip so as to provide good heat conductivity from the junction to the body of the tip and to properly anchor the thermal junction to the tip. The constantan wires may be B & S gauge No. 28 and are preferably insulated beyond the junction with glass fiber insulation impregnated with a silicone resin. The copper element may likewise be of B & S gauge No. 28 and similarly insulated. The diameter of the twisted wires constituting the junction 4 should preferably be just slightly less than the inner diameter of the opening in the tip which receives them so that there is but a thin film of silver solder required for making the electrical, thermal, and mechanical connection with the tip, thus assisting in attaining the desired high degree of sensitivity.

The probe tube 2 is received within a holder 8 which includes a substantially cylindrical portion 9 which is adapted to be mounted in a suitable bearing, not shown, so that the probe may be mechanically inserted into the mass under treatment and withdrawn therefrom. The holder 8 also includes a connector portion 10 threaded at 11 to receive a standard electrical connector, such as an "Amphenol" connector. The holder 8 adjacent its forward end is bored out at 12, and there is inserted therein a hollow cylindrical piece of electrical insulation 13, which insulation is preferably heat-resistant, a good dielectric, and has superior mechanical characteristics. Material known as "Mycalex 400" consisting of a glass bonded mica insulation is satisfactory. The opposite end of the holder is bored as indicated at 14 and receives a hollow cylindrical piece of insulation 15, which may be of the same composition as the insulation 13. Between the bores 12 and 14 is a central bore 16 which receives a hollow cylindrical piece of insulation 17. This piece may be formed of "Mycalex" but preferably it is formed of "Teflon" which is polytetrafluoroethylene.

The insulation element 15 is provided with a bore 18 having a conical bottom 19, the taper of which corresponds to a taper provided on the end 20 of the probe tube 2. A compression plug 21 of insulation which may be the same as the insulation element 15 is provided, having an outer diameter corresponding to the diameter of the bore 18 and having a tapered surface 22 corresponding to the taper of the end 20 of the probe tube 2. The portion 10 of the holder 8 is provided with a screw thread projection 23 which receives a hollow head, flat based screw 24. The screw 24 and the compression plug 21 are centrally bored to provide a passage through which the leads from the thermal-responsive elements may pass from the interior of the probe tube 2. The openings within the insulation elements 15 and 17 are of such size that a light friction fit is provided between these elements and the probe tube 2, but the insulation element 13 is bored so as to provide a tight friction fit with the probe tube 2 in order to properly support the tube to prevent lateral or radial displacement during insertion of the probe into the mass under treatment.

In the assembly of the device, the insulation elements are fitted into the holder 8, with the exception, of course, of the compression plug 21. The probe tube 2 is then inserted into the central bores in the insulation pieces and pressed to a position with its flanged end 20 disposed in the bore 18 of the insulation piece 15. The compression plug 21 is then inserted and the hollow head screw 24 is threaded into position, forcing the compression plug 21 into the bore 18, and seating the probe tube in proper position, as indicated in Figure 1.

A single piece tip 3 is shown in Figure 1. This tip may be formed of a wear-resistant, heat-conductive material such as an alloy of copper and beryllium. Where greater heat sensitivity is necessary or desirable, a fabricated tip such as shown in Figure 3 may be employed. In this embodiment, the ogival portion 25 of the tip is made of substantially pure silver, which has about the highest thermal conductivity of known materials, a low specific heat, and is reasonably resistant to wear. The portion 25 is connected to a shank portion 26 which may be formed of an alloy of copper and beryllium. The two portions are electrically and thermally connected by silver solder 27. It will be necessary, of course, to use a solder for the joint 27 having a melting point somewhat higher than the melting point of the silver solder used to join the thermocouple junction to the tip. For example, a silver solder having a melting point of about 1300° F. may be employed at the joint 27, and a silver solder having a melting point of 1160° F. to 1175° F. may be employed for connecting the thermal junction to the tip. It will be noted that the ogival portion 25 is provided with a bore 28 which extends to a point close to the outer periphery of the tip. It is in this bore 28 that the thermocouple junction is secured. There is a larger diameter bore 29 which extends throughout the shank portion 26 and into the tip portion 25 which receives the insulated portions of the wires constituting the thermal junction. It should be borne in mind that in Figures 1, 2, and 3 the parts are shown to greatly enlarged scale. For example, the over-all length of the device may be about 14½ inches with the total length of the tip shown in Figure 3 being but .334" and a diameter of .140" and the bore 28 having a diameter of .036".

A modification of the device is shown in Figure 2. It includes a probe tube 30 which may be made of material similar to the probe tube 2. The probe tube has a tip 31 which may be formed in the same manner as the tip 3 of Figure 1, or the tip shown in Figure 3 may be substituted. The probe tube 30 is received within a holder 32, having an outer configuration generally the same as the holder of the device of Figure 1. The holder 32 is bored at 33 to provide an opening for the reception of a piece of electrical insulation 34 which may be the same as the insulation members 13 and 15 of Figure 1. This hollow cylindrical piece 34 is provided with a tapered projection 35 adapted to receive the correspondingly tapered end 36 of the probe tube 30. A compression plug 37 of insulation is provided. This insulation may be the same as the piece 34. The piece 37 is provided with a central bore 38 which receives the probe tube 30 and is provided with a tapering recess 39 corresponding in taper to the portion 36 of the probe tube. A cover cap 40 is threaded onto the end of the holder 32 and is provided with a central opening 41 which is of larger diameter than the outer diameter of the tube 30. A central bore 42 is provided within a web 43 in the holder 32 for the passage of the leads from the thermal junction 44. A screw thread projection 45 is provided on the opposite end of the holder 32 to receive an "Amphenol" or similar connector.

In the assembly of the device, the piece 34 is disposed within the bore 33 and the tube 30 is forced through the piece 37. A tight friction fit is provided between the tube 30 and the piece 37, in order to properly support the tube against deflection. The tube and insulation piece are then inserted in the bore 33 and the clamping cover cap 40 is screwed down into position, forcing the elements into the position shown in Figure 2 and firmly clamping the tube against displacement.

It will be observed that in both devices the thermo-sensitive element is electrically connected to the probe tube and the probe tube is electrically insulated from its supporting holder. The capacitance of the device of Figure 2 is less than that of Figure 1, but in neither is it of such magnitude that it will deleteriously affect the indicating and control equipment or lead to any substantial errors in temperature reading or effective control.

Figure 4 diagrammatically illustrates a typical installation where temperature-responsive devices of the present invention are employed. There is illustrated a mass 46, such as a mass of cork composition being dielectrically heated in a mold between electrodes upon which is impressed a high frequency current. There are two probes shown in Figure 4, one disposed adjacent one edge of the mass, and the other disposed about centrally of the mass. In the proposed arrangement, it is desired to control the supply of high frequency current to the electrodes in accordance with the temperature attained by the mass, and since there may be some variation between the temperature adjacent the electrodes and at the center of the mass, the arrangement includes two temperature responsive devices. The temperature-responsive device disposed near one edge of the mass is numbered 47 and a second element disposed at the center of the mass is numbered 48. The device 47 includes one thermocouple 49 with a negative lead 50 and a positive lead 51, and the element 48 includes a thermal junction 52 with two negative leads 53 and 54 and one positive lead 55. The probe tubes 56 and 57 have been indicated by dotted lines in Figure 4, and it will be observed that they are disposed within holders 58 and 59, respectively, and that the holders are insulated from the tubes by insulation 60 and 61. The holders 58 and 59 are connected to ground by leads 62.

The leads 54 and 55 are connected to a temperature recorder 63, and this recorder includes an arrangement for supplying energy to a control 64 which is effective for cutting off the supply of high frequency power to the electrodes between which the mass under treatment is disposed. Thus, when the mass attains the desired end temperature at its center the thermocouple 52 will have supplied sufficient direct current to the device 63 to indicate proper curing temperature and simultaneously actuate the control 64. The lead 53 of the thermocouple 52 is connected to a potentiometer 65, the other side of the potentiometer is connected to the thermocouple 49 by the lead 50, while thermocouples 49 and 52 are interconnected electrically by joining the positive leads 51 and 55. In this arrangement, the potentiometer 65 is actuated by the temperature difference existing between thermal junctions 49 and 52, and in turn, the potentiometer is effective in actuating, through a discriminating controller 66, a control 67 for decreasing the high frequency power and a similar control 68 for increasing the high frequency power in accordance with the aforementioned differences in temperatures between those at the thermocouple 49 and the thermocouple 52. Thus the heating of the mass may be effectively controlled in accordance with temperature differences within the mass. This is particularly desirable where the electrodes are heated, for it makes possible the proper application of high frequency current to the mass to obtain substantially uniform heating as is more fully set forth in the Gard application referred to above.

The present invention is not limited to use with the specific indicating and controlling arrangement illustrated and described but is applicable to any system including electrical means actuated by the thermal-responsive device.

Figure 5 is a diagrammatic view illustrating the disposition of the thermal-responsive elements of Figure 4 in a mold, such as disclosed in the copending application of George W. Scott, Jr., Serial No. 678,215, filed June 21, 1946, and entitled "Mold for Confining Material During Dielectric Heating," now Patent 2,526,698. Corresponding numbers have been applied to the thermal-responsive elements, numbers 47 and 48, as well as to the ground connection 62. The mold has been indicated at 69 and the mass at 70. The mass is disposed between an upper electrode 71 and a lower electrode 72, the electrodes being held in position by through pins 73 disposed above and below the upper and lower electrodes and holding the mass 10 under the desired degree of compression. The electrodes are connected to a source of high frequency voltage which has been designated on the drawing. The control system from the thermal-responsive elements 47 and 48 may be the same as that shown in Figure 4.

The present invention is not limited to a system wherein thermocouples are employed. Fine wire resistance elements may be substituted for one or more of the thermal junctions, and thermistors and other similar thermally sensitive devices may be substituted.

While I have illustrated and described certain preferred embodiments of my invention, it will be understood the same is not limited thereto but may be otherwise embodied and practiced within the scope of the following claims.

I claim:

1. In an apparatus for dielectrically heating a mass of material: (1) a first electrode, (2) a second electrode, (3) means connecting said electrodes to a source of high frequency alternating electric current to establish a high frequency field between said electrodes, (4) a temperature-responsive device disposed adjacent to one of said electrodes within said field during dielectric heating of a mass positioned between said electrodes, (5) a second temperature-responsive device positioned within said field and at a different high frequency potential than said other temperature-responsive device, each of said temperature-responsive devices comprising: (a) a metallic probe tube having a projecting portion, (b) a thermocouple electrically connected to said probe tube at the end of the projecting portion thereof, (c) thermocouple leads extending through said probe tube, (d) a layer of electrical insulation surrounding the remaining portion of said probe tube, and (e) a metallic shielding holder surrounding said insulation, (6) an electrical connection between elements of said thermocouples of one polarity, (7) an electrical control device responsive to direct current of small magnitude delivered thereto from elements of said thermocouples of the other polarity in response to temperature differentials existing between said thermocouples, and (8) a capacitative coupling to ground to render each unit of a thermocouple and its leads disposed within said field at different high frequency potentials essentially free of any tendency to provide a path for high frequency current to said electrical control which would affect said control, said coupling to ground for each unit comprising: (a) said metallic shielding holder, (b) said metallic probe tube to which said thermocouple is electrically connected, (c) said electrical insulation layer disposed between said metallic probe tube and said metallic holder, and (d) a ground lead electrically connected to each said metallic shielding holder.

2. In an apparatus for dielectrically heating a mass of material: (1) a first electrode, (2) a second electrode, (3) means connecting said electrodes to a source of high frequency alternating electric current to establish a high frequency field between said electrodes, (4) a temperature-responsive device disposed adjacent to one of said electrodes and within said field during dielectric heating of a mass positioned between said electrodes, (5) a second temperature-responsive device positioned within said field midway between said electrodes and at a different high frequency potential than said other temperature-responsive device, each of said temperature-responsive devices comprising: (a) a metallic probe tube having an exposed portion for insertion into said mass, (b) a thermocouple electrically connected to said probe tube at the end of the exposed portion thereof, (c) thermocouple leads extending through said probe tube, (d) a layer of electrical insulation surrounding the unexposed portion of said tube, and (e) a metallic shielding holder surrounding said insulation, (6) an electrical connection between elements of said thermocouples of one polarity, (7) an electrical control device responsive to direct current of small magnitude delivered thereto from elements of said thermocouples of the other polarity in response to temperature differentials existing between said thermocouples, and (8) a capacitative coupling to ground to render each unit of a thermocouple and its leads disposed within said field at different high frequency potentials essentially free of any tendency to provide a path for high frequency current to said electrical control which would affect said control, said coupling to ground for each unit comprising: (a) said metallic shielding holder, (b) said metallic probe tube to which said thermocouple is electrically connected, (c) said electrical insulation layer disposed between said metallic probe tube and said metallic holder, and (d) a ground lead electrically connected to each said metallic shielding holder.

3. In an apparatus for dielectrically heating a mass of material: (1) a first electrode, (2) a second electrode, (3) means connecting said electrodes to a source of high frequency alternating electric current to establish a high frequency field between said electrodes, (4) a temperature-responsive device disposed adjacent to one of said electrodes within said field during dielectric heating of a mass positioned between said electrodes, (5) a second temperature-responsive device positioned within said field and at a different high frequency potential than said other temperature-responsive device, each of said temperature-responsive devices comprising: (a) a metallic probe tube having a projecting portion, (b) a thermocouple electrically connected to said probe tube at the end of the projecting portion thereof, (c) thermocouple leads extending through said probe tube, (d) a layer of electrical insulation surrounding the remaining portion of said probe tube, and (e) a metallic shielding holder surrounding said insulation, the second of said thermocouples having a plurality of elements of one polarity and a single thermal junction, (6) an electrical connection between said elements of said thermocouples of one polarity, (7) an electrical control device responsive to direct current of small magnitude delivered thereto from one of said plurality of elements of one polarity of said second thermocouple and an element of the same polarity of said other thermocouple in response to temperature differentials existing between said thermocouples, (8) a second electrical control device responsive to direct current of small magnitude delivered thereto from a second element of one polarity of said second thermocouple and an element of opposite polarity of said second thermocouple, and (9) a capacitative coupling to ground to render each unit of a thermocouple and its leads disposed within said field at different high frequency potentials essentially free of any tendency to provide a path for high frequency current to said electrical control which would affect said control, said coupling to ground for each unit comprising: (a) said metallic shielding holder, (b) said metallic probe tube to which said thermocouple is electrically connected, (c) said electrical insulation layer disposed between said metallic probe tube and said metallic holder, and (d) a ground lead electrically connected to each said metallic shielding holder.

IMRE J. BARSY.

REFERENCES CITED

The following references are of record in the file of this patent:

UNITED STATES PATENTS

| Number | Name | Date |
|---|---|---|
| 1,825,372 | Sykes | Sept. 29, 1931 |
| 2,012,112 | States | Aug. 20, 1935 |
| 2,047,152 | Mitchell | July 7, 1936 |
| 2,064,831 | Hawksley | Dec. 22, 1936 |
| 2,311,886 | Thomas | Feb. 23, 1943 |
| 2,343,242 | Richmond | Mar. 7, 1944 |
| 2,361,215 | Lamberger et al. | Oct. 24, 1944 |
| 2,466,175 | Kretsch et al. | Apr. 20, 1949 |
| 2,508,382 | Gard | May 23, 1950 |
| 2,508,752 | Drugmand | May 23, 1950 |